United States Patent [19]
Kihara et al.

[11] Patent Number: 5,352,011
[45] Date of Patent: Oct. 4, 1994

[54] BODY STRUCTURE OF AN AUTOMOTIVE VEHICLE

[75] Inventors: Kenzo Kihara; Kousuke Murakami, both of Aki; Atsushi Nishiyama; Masayuki Takamitsu, both of Hiroshima; Yoshio Fujii, Higashihiroshima; Ryuji Matsumura, Hiroshima, all of Japan

[73] Assignee: Mazda Motor Corporation, Hiroshima, Japan

[21] Appl. No.: 974,431

[22] Filed: Nov. 12, 1992

[30] Foreign Application Priority Data

Nov. 11, 1991 [JP] Japan ................... 3-323651
Dec. 6, 1991 [JP] Japan ................... 3-349709

[51] Int. Cl.$^5$ ................. B62D 25/20; B62D 25/02
[52] U.S. Cl. .............................. 296/203; 296/204; 296/209
[58] Field of Search ............... 296/35.1,203, 204, 209, 296/194

[56] References Cited

U.S. PATENT DOCUMENTS

| | | | |
|---|---|---|---|
| 2,261,860 | 11/1941 | Saives | 296/35.1 |
| 2,380,523 | 7/1945 | Hicks et al. | 296/204 |
| 4,593,949 | 6/1986 | Tanimoto | 296/209 X |
| 5,018,780 | 5/1991 | Yoshii et al. | 296/204 X |
| 5,127,704 | 7/1992 | Komatsu | 296/194 X |

FOREIGN PATENT DOCUMENTS

| | | | |
|---|---|---|---|
| 1455813 | 5/1969 | Fed. Rep. of Germany | 296/204 |
| 73369 | 4/1984 | Japan | 296/204 |
| 186783 | 10/1984 | Japan | 296/35.1 |
| 62-150279 | 9/1987 | Japan . | |
| 1-175973 | 12/1989 | Japan . | |
| 3-40287 | 4/1991 | Japan . | |

*Primary Examiner*—Dennis H. Pedder
*Attorney, Agent, or Firm*—Keck, Mahin & Cate

[57] ABSTRACT

A vehicle body structure has a chassis frame to which a pair of side sills are rigidly connected sideways by a plurality of connecting bracket assemblies. One of the connecting bracket assemblies is disposed between a pair of pillars and includes an outer bracket member connected to each side sill and an inner bracket member connected to the chassis frame.

10 Claims, 10 Drawing Sheets

BODY STRUCTURE OF AN AUTOMOTIVE VEHICLE

BACKGROUND OF THE INVENTION

1. Field of the invention

The present invention relates to a body structure of an automotive vehicle, and, in particular, to a vehicle body structure in which a body is connected to a chassis frame.

2. Description of Related Art

Heavy duty vehicles, such as off road vehicles have recently been developed and put into practice. Such a heavy duty vehicle typically has a vehicle body connected to a chassis frame. In addition to mono-chock bodies, heavy duty vehicle bodies with a chassis frame typically have a pair of side sills, having a closed cross section and extending in a lengthwise direction of the vehicle body, a floor panel connected to the side sills, and a pillar having a closed cross section and extending upward from each of the side sills. The vehicle body is practically connected to the chassis frame by means of a plurality of mount brackets secured to the vehicle body at appropriate separations and a plurality of support brackets secured to the chassis frame correspondingly to the mount brackets. The pillar is secured to a side roof rail of a roof panel.

In this kind of a body structure, the mount bracket is provided away from the pillar, and the pillar is mechanically indirectly connected at its lower end to the chassis frame, so that the stiffness of the connection is weak between the pillar and the chassis frame. Consequently, the pillar tends to cause vibrations due to an impact caused by a door when the door is closed and vibrations transmitted from a suspension and an engine during driving. Such vibrations of the pillar generate noises in a passenger compartment of the vehicle. Further, the pillar may possibly be deformed by an impact upon a side collision. In order to increase the structural safety of the passenger compartment, the pillar and the chassis frame must be connected with increased structural stiffness.

SUMMARY OF THE INVENTION

It is, therefore, an object of the present invention to provide a structure of a vehicle body having an increased stiffness of connection between pillars and a chassis frame which decreases noise caused within an interior of the vehicle due to vibration of the pillars and provides an increased safety of the vehicle interior upon a side collision.

The foregoing object of the present invention is achieved by providing a vehicle body structure including a chassis frame in which a pair of side sills are rigidly connected to the chassis frame by a plurality of connecting bracket means and a pair of pillars extending upward from the side sills, respectively. A pair of roof side rails, extending in the lengthwise direction on opposite sides of a roof panel and holding the roof panel, are connected to tops of the pillars. One of the connecting bracket means, which is disposed below and adjacent to each pillar, comprises an outer bracket, connected to each side sill and the floor panel, and an inner bracket, connected to the chassis frame. A footing means, through which a seat is mounted to the vehicle body, is disposed on a floor panel and connected to at least one of the pillar and the side sill so as to form a closed cross section therebetween. The footing means comprises a pair of end platforms, each of which is disposed adjacent to the respective pillar, or, otherwise, a generally U-channeled cross beam extending, the pillars.

In a preferred embodiment, the body structure has a generally U-channeled roof cross beam extending between the side rails and connected to the roof panel so as to form a closed cross section therebetween. The roof cross beam and the floor cross beam cooperate with the pillars to form a closed cross frame encircling the vehicle compartment of the vehicle.

The body structure according to the present invention, in which the pillars are connected at their lower ends to the chassis frame through the connecting bracket means, provides a greatly increased stiffness to the connection between the chassis frame and the pillars, so as to decrease noise due to vibration of the pillars caused by doors and transmitted from an engine and suspensions during driving. Furthermore, the body structure prevents the center pillars from being deformed when a great impact is applied sideways to the vehicle body, so that the interior of the vehicle is kept safe.

Connecting the footing means, through which a seat is mounted to the vehicle body, to at least one of the pillar and the side sill so as to form a closed cross section therebetween also provides an increased stiffness to the connection between the chassis frame and the pillars. This also decreases noise due to vibration of the pillars caused by doors and transmitted from an engine and suspensions during driving and prevents the center pillars from being deformed and, accordingly, keeps the interior of the vehicle safe when a great impact is applied sideways to the vehicle body.

Employing a floor cross beam as the footing means extending over the floor panel in the transverse direction provides an increased stiffness to the connection between the floor panel and the connecting bracket means and frame and the pillars, so as to increase the structural stiffness of the vehicle body against bending and twisting.

BRIEF DESCRIPTION OF THE DRAWINGS

The foregoing and other objects and features of the present invention will be understood more clearly and fully from the following detailed description of the preferred embodiment thereof when considered in conjunction with the accompanying drawings, in which the same reference numerals have been used to denote the same or similar elements, and wherein.

DETAILED DESCRIPTION OF THE PREFERRED EMBODIMENTS

Because body structures are well known, the present description will be directed in particular to elements forming part of, or cooperating with, the novel structure of a rear door in accordance with the present invention. It is to be understood that elements not specifically shown or described can take various forms well known to those skilled in the art.

It should be noted that the terms "front," "rear," "left" and "right" in this specification indicate directions toward the front, rear, left side and right side of a vehicle, respectively.

Figure 1:
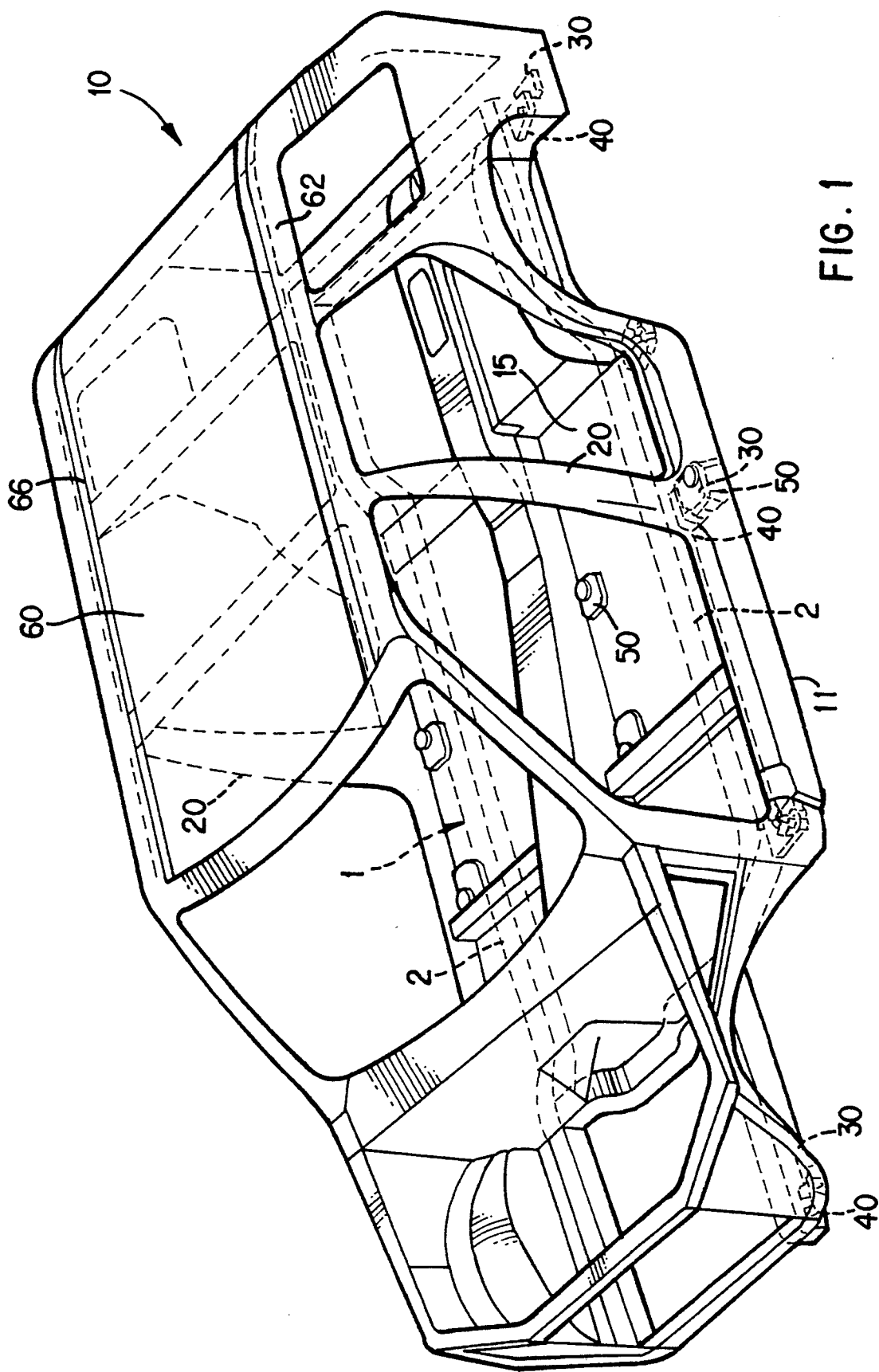
FIG. 1 is a schematic perspective view showing a vehicle body connected to a chassis frame in accordance with a preferred embodiment of the present invention.
Figure 2:
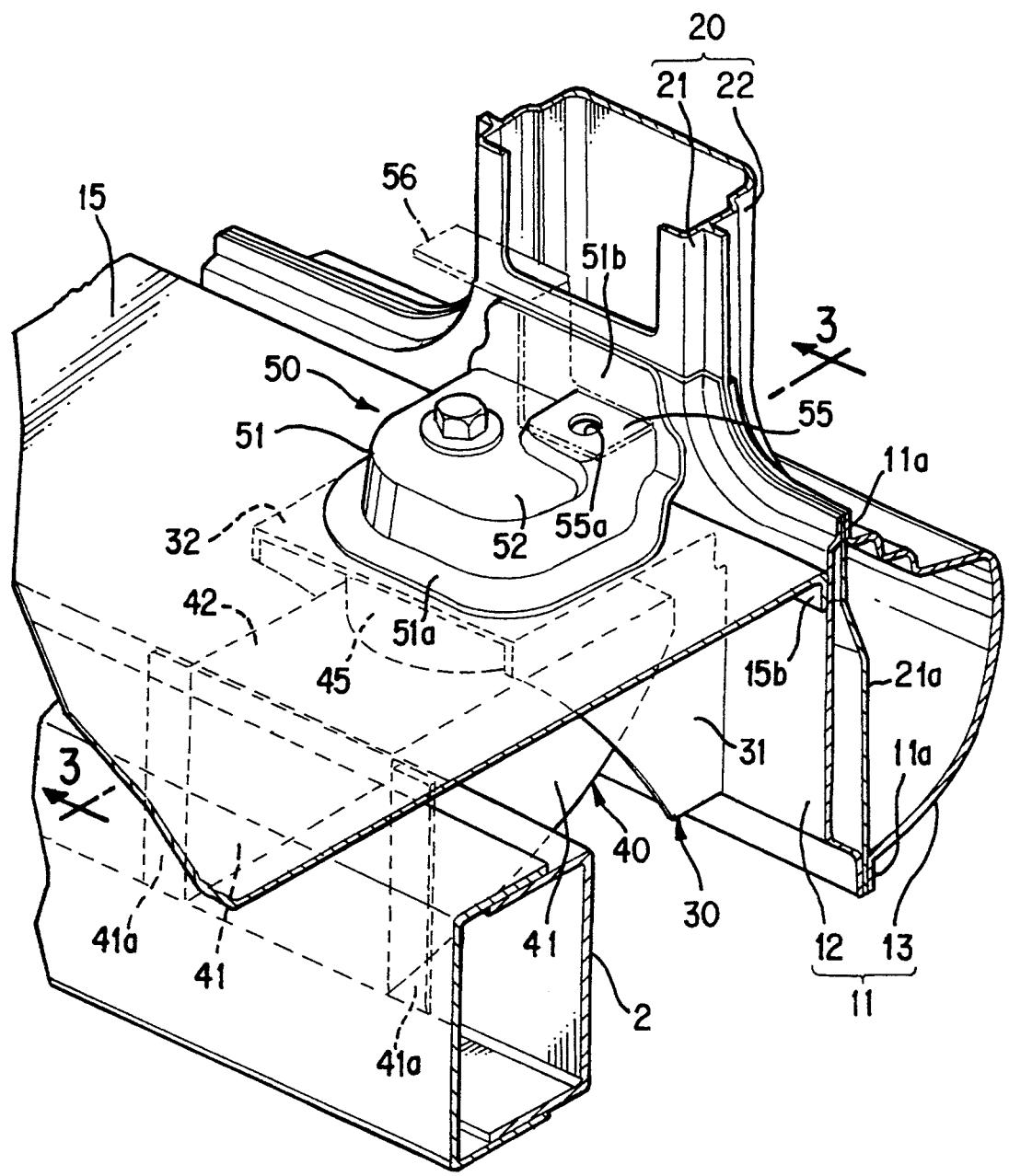
FIG. 2 is a detailed perspective view of a lower portion of a center pillar of the vehicle body shown in FIG. 1.
Figure 3:
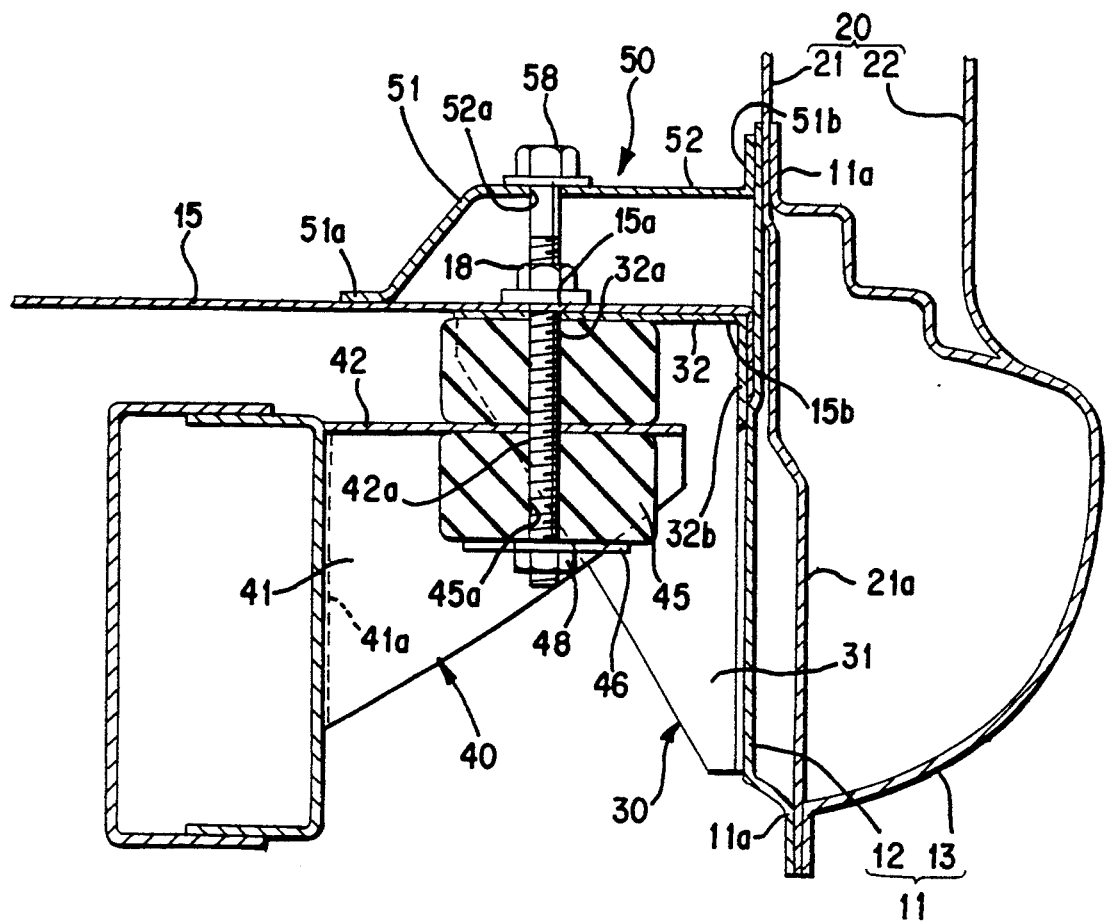
FIG. 3 is a cross-sectional view of FIG. 2 along line 3—3.

Referring to the drawings in detail and, in particular, to FIGS. 1 to 3, a vehicle body connected to a chassis frame in accordance with a preferred embodiment of the present invention is shown. A vehicle body 10 is placed on a chassis frame 1. On opposite lateral sides of the chassis frame, left and right side frames 2 extend in a lengthwise direction from the front to the back of the vehicle body 10. The vehicle body 10 is provided with a plurality of, for instance, five in this embodiment, outer connecting brackets 30 secured to each side thereof. Each of the outer connecting brackets 30 projects laterally inward. Each of the side frames 2 is provided with a plurality of inner connecting brackets 40. The same numbers of the outer connecting brackets 30 and inner connecting brackets 40 are provided so that the inner connecting brackets 40 positionally correspond to the outer connecting brackets 30. Each outer connecting bracket 30 is connected to each corresponding inner connecting bracket 40 through a cushion member 45 (see FIG. 3).

On an outer side of each side frame 2 of the chassis frame 1, there is provided a side sill 11. The side sill 11 comprises a generally plate-like inner side sill member 12 and a generally U-channel like outer side sill member 13. The outer side sill member 13 is formed with upper and lower flanges 11a. The outer side sill member 13 is secured to the inner side sill member 12 through the upper and lower flanges 11a so as to form a closed cross section. A floor panel 15, formed with side flanges 15b, is welded, or otherwise secured, sideways to an upper portion of the inner side sill panel 15 through the side flange 15b. A center pillar 20 is provided so as to extend upward from the side sill 11. The center pillar 20 comprises a U-channel like inner pillar member 21 and a U-channel like outer pillar member 22 secured to each other so as to form a closed cross section. The inner pillar member 21 has a lower pillar extension 21a, extending beyond the lower end of the outer pillar member 22, which is disposed between the inner side sill member 12 and the upper and lower flanges 11a of the outer side sill member 13. The outer pillar member 22 is secured at its lower end to the outer side sill member 13. In such a way, by securing the lower pillar extension 21a of the inner pillar member 21 to the side sill 11, there is formed a closed cross section in the center pillar 20.

Under the floor panel 15, there are located, below the center pillar 20, one of the outer connecting brackets 30 (which is hereafter referred to a center outer connecting bracket) secured to the inner side surface of the side frame 11 and one of the inner connecting brackets 40 (which is hereafter referred to as a center inner connecting bracket) secured to an outer surface of the side frame 2. Opposite to the center outer connecting bracket 30, with respect to the floor panel 15, there is a footing mount 50 secured to the floor panel 15. The floor panel 15 is formed with a bolt hole 15a and is secured with a nut 18 at the bolt hole 15a. The center inner connecting bracket 40 comprises generally rectangularly shaped front and rear walls 41 and a square top wall 42 formed with a bolt hole 42a. The front and rear walls 41 are separated at a lengthwise separation larger than a lengthwise separation at which the front and rear walls 31 of the center outer connecting bracket 30 are separated. Each of the front and rear walls 41 is formed with a flange 41a which is secured to the side frame 2.

Figure 4:
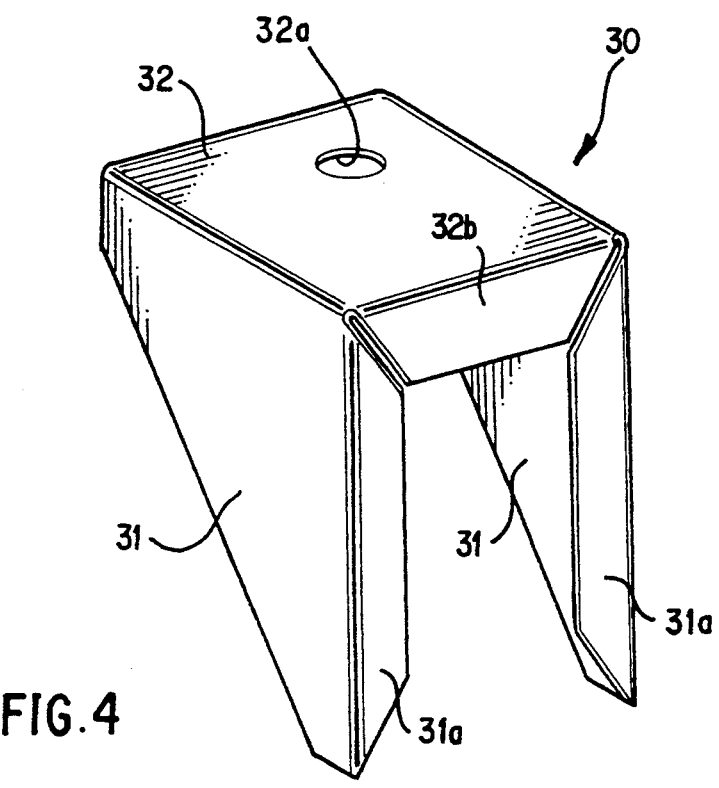
FIG. 4 is a perspective view of a connecting bracket.

Referring to FIG. 4, the center outer connecting bracket 30 comprises generally rectangularly shaped front and rear walls 31 secured to the side sill 11 and a square top wall 32 secured to the floor panel 15. Specifically, each of the front and rear walls 31 is formed with a flange 31a which is secured to the inner side sill member 12. The top wall 32 is formed with a flange 32b which is secured to the flange 15b of the floor panel 15. The top wall 32 is formed with a hole 32a.

Referring to FIG. 3, the top wall 42 of the center inner connecting bracket 40 is provided with upper and lower cushion rubber blocks 45 secured to upper and under surfaces thereof, each of which is formed with a bolt bore 45a. The lower cushion rubber block 45 is secured with a nut 48 at the bolt bore 45a through a support plate 46. The footing mount 50 comprises a generally L-shaped bracket body 51 including a top wall 52 formed with a bolt hole 52a. The bracket body 51 is formed with a peripheral flange 51a extending from the lower edge of the bracket body 51 and a side flange 51b extending upward from the top wall 52. The bracket body 51 is secured to the floor panel 15 and the center pillar 20 through the peripheral flange 51a and the side flange 51b, respectively, so as to form a closed cross section therebetween. The top wall 52 is formed at its rear outer end with a fitting 55 formed with a bolt hole 55a. A seat fitting mount 56 is bolted to the mount 55a for fitting a seat.

The center inner connecting bracket 40 is placed under the center outer connecting bracket 30, with its bolt hole 42a in alignment with all the bolt holes and the bolt bores 32a, 45a, 15a and 52a, and fixedly assembled to the center outer connecting bracket 30 and the floor panel 15 by a fitting bolt 58 and the nut 48.

Figure 5:
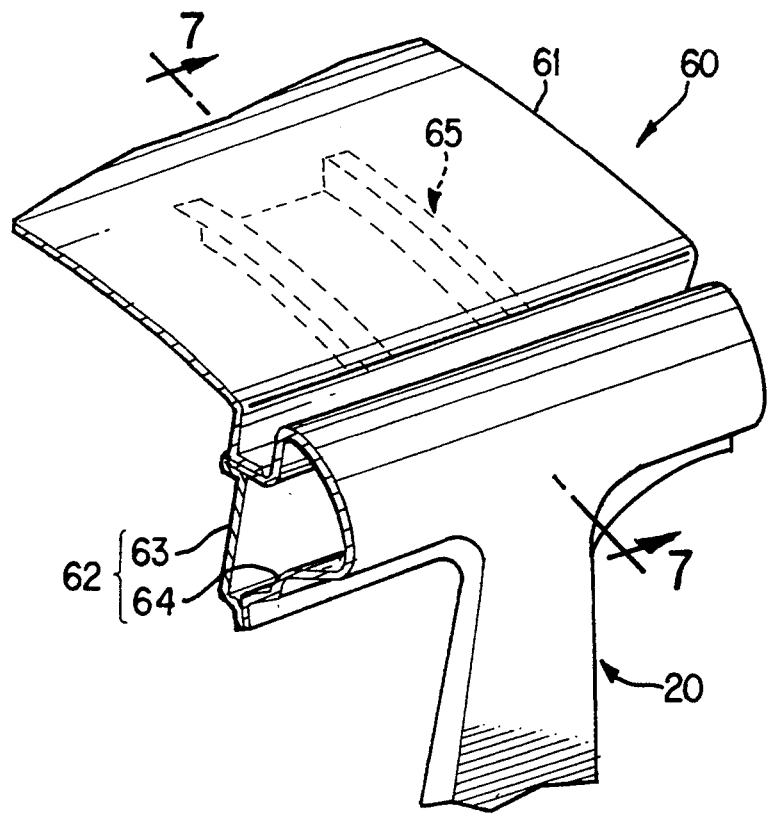
FIG. 5 is a detailed perspective view of an upper portion of a center pillar of the vehicle body shown in FIG. 1.
Figure 6:
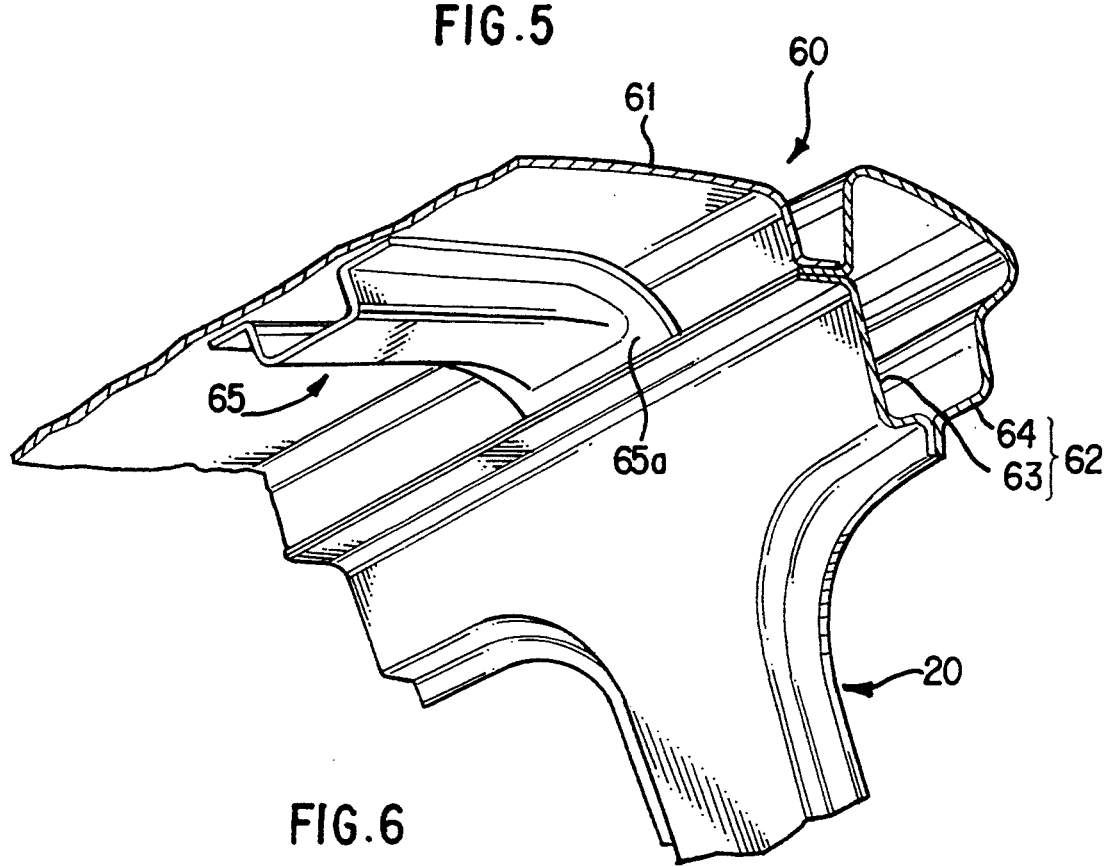
FIG. 6 is a perspective view of FIG. 5 along line 6—6.
Figure 7:
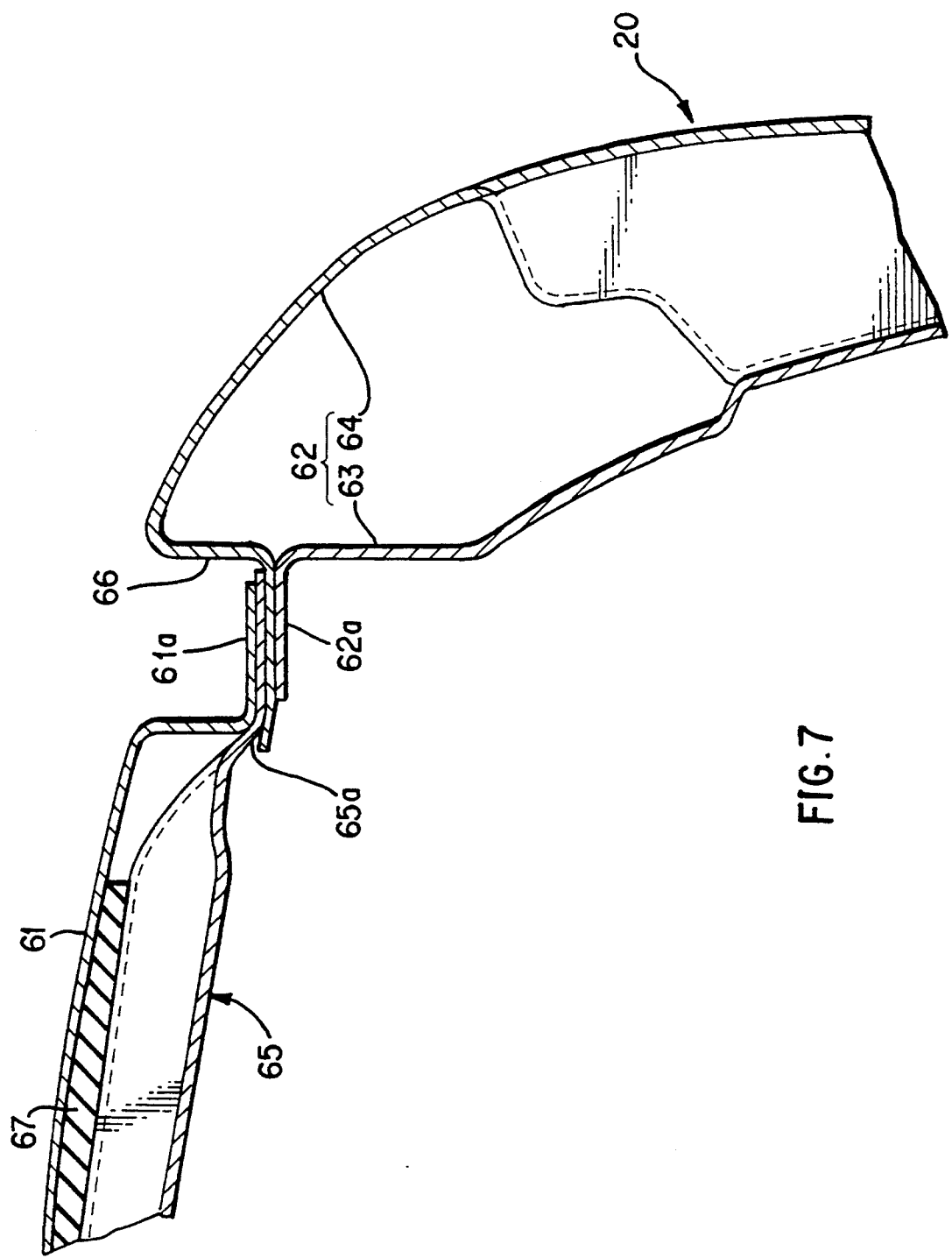
FIG. 7 is a cross-sectional view of FIG. 5 along line 7—7.

Referring to FIGS. 5 to 7, the center pillar 20 is connected at its upper end to a roof 60 of the vehicle body 10. The roof 60 comprises a roof panel 61 and roof side rails 62 provided on opposite sides of the roof panel 61. Each of the roof side rails 62 comprises an inner side rail 63 and an outer side rail 64 which are connected to each other so as to form a closed cross section and provide a side flange 62a. The roof panel 61 is formed with a side flange 61a along its side. Under the roof panel 61, there is provided a channel-shaped roof cross beam 65 extending between the left and right center pillars 20. Each end of the roof cross beam 65 is formed with a peripheral flange 65a. The roof cross beam 65 is connected to the roof panel 61 through their flanges 61a and 65a so as to form a closed cross section therebetween. The roof panel 61 and the side rail 62 are also connected to the center pillar 20 through their flanges 61a, 65a and 62a and provide a side groove 66 extending in the lengthwise direction for receiving a sealing member therein. Between the roof panel 61 and the roof cross beam 65 there is disposed a cushon member 67.

In the body structure described above, in which the center pillar 20 cooperates at its upper end with the roof cross beam 65 secured to the roof panel 61 between the roof side rails 62 and at its lower end with the center outer connecting bracket 30 and the center inner connecting bracket 40, a greatly increased structural stiffness is obtained between the chassis frame 2, the roof 60 and the center pillar 20. Such helps to reduce vibrations generated by an engine and suspensions. The body structure also prevents the center pillar 20 from being deformed in the event a great impact is applied sideways to the vehicle body, so that the interior of the vehicle is kept safe. Furthermore, in the body structure in which a seat is mounted on the footing mount 50 through the fitting mount 55, the seat is firmly retained during a front end collision of the vehicle so as to be prevented from moving forward. This keeps the occupant of the seat safe.

Figure 8:
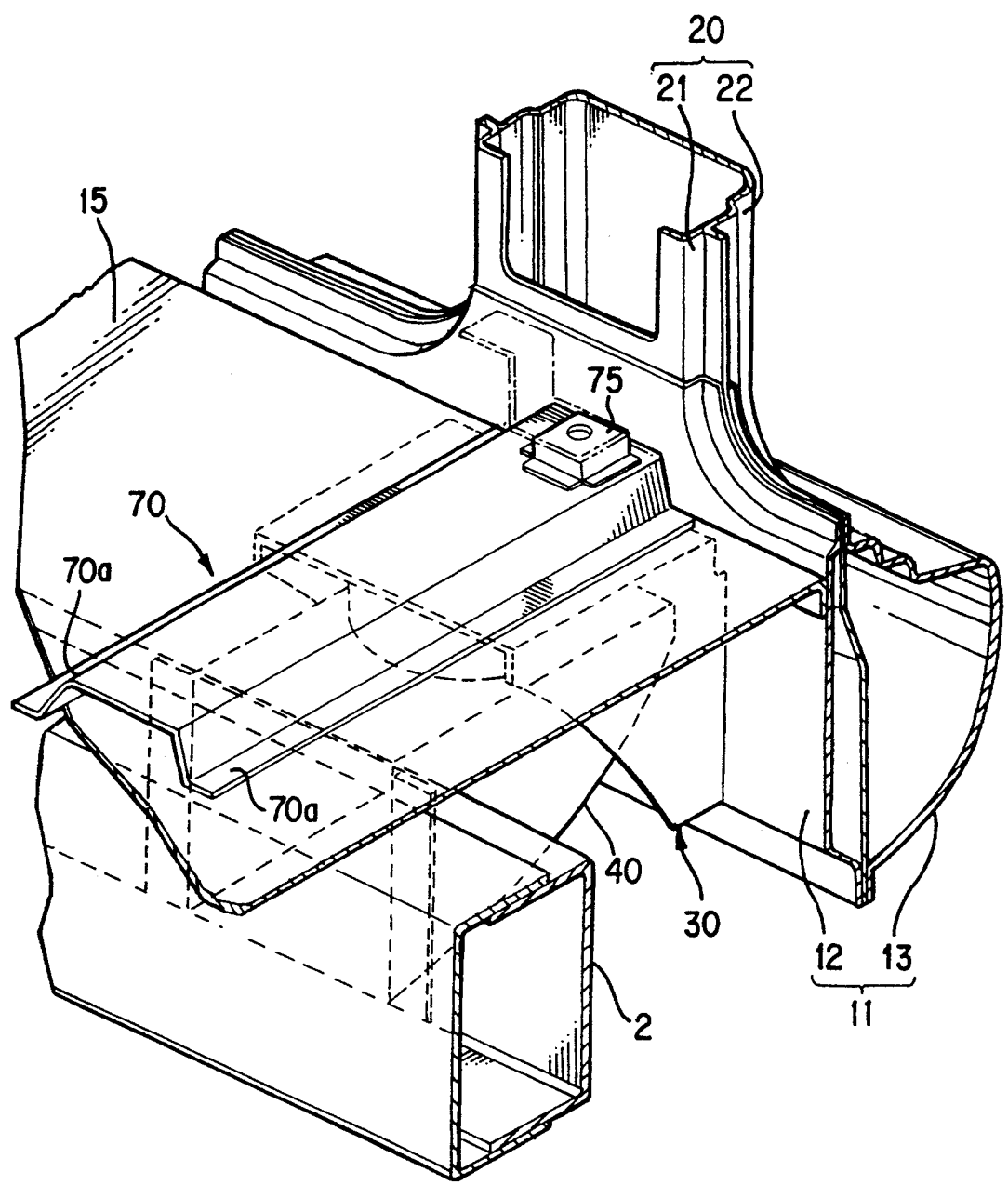
FIG. 8 is a detailed perspective view, similar to FIG. 2, showing a variation of the lower portion of the center pillar of the vehicle body shown in FIG. 1.

Referring to FIG. 8, in the body structure, the footing mount 50 may be replaced with a generally U-shaped floor cross beam 70 as shown. The floor cross beam 70, formed with front and rear flanges 70a, extends in the transverse direction and is welded, or otherwise secured, to a floor panel 15 through the front and rear flanges 70a between the opposite center inner connecting brackets 30 so as to form a closed cross section therebetween. A fitting 75 is provided on the top wall 71 of the floor cross beam 70 at each transverse end.

In the body structure, the floor cross beam 70, thus provided, increases the stiffness of a connection between the chassis frame 2 and the center pillar 20. Furthermore, the left and right center pillars 20 are structurally interconnected at both their upper and lower ends by the roof cross beam 65 and the floor cross beam 70 to form a closed cross frame surrounding the central portion of the vehicle body, so as to increase the structural stiffness of the vehicle body against bending and twisting.

It is to be understood that the footing mount 50 or the floor cross beam 70 may be directly connected to the inner pillar member 21 of the center pillar 20 or to both the inner side sill member 12 of the side sill 11 and the inner pillar member 21 of the center pillar 20, also, such a body structure may be installed in a front body section including front pillars.

Figure 9:
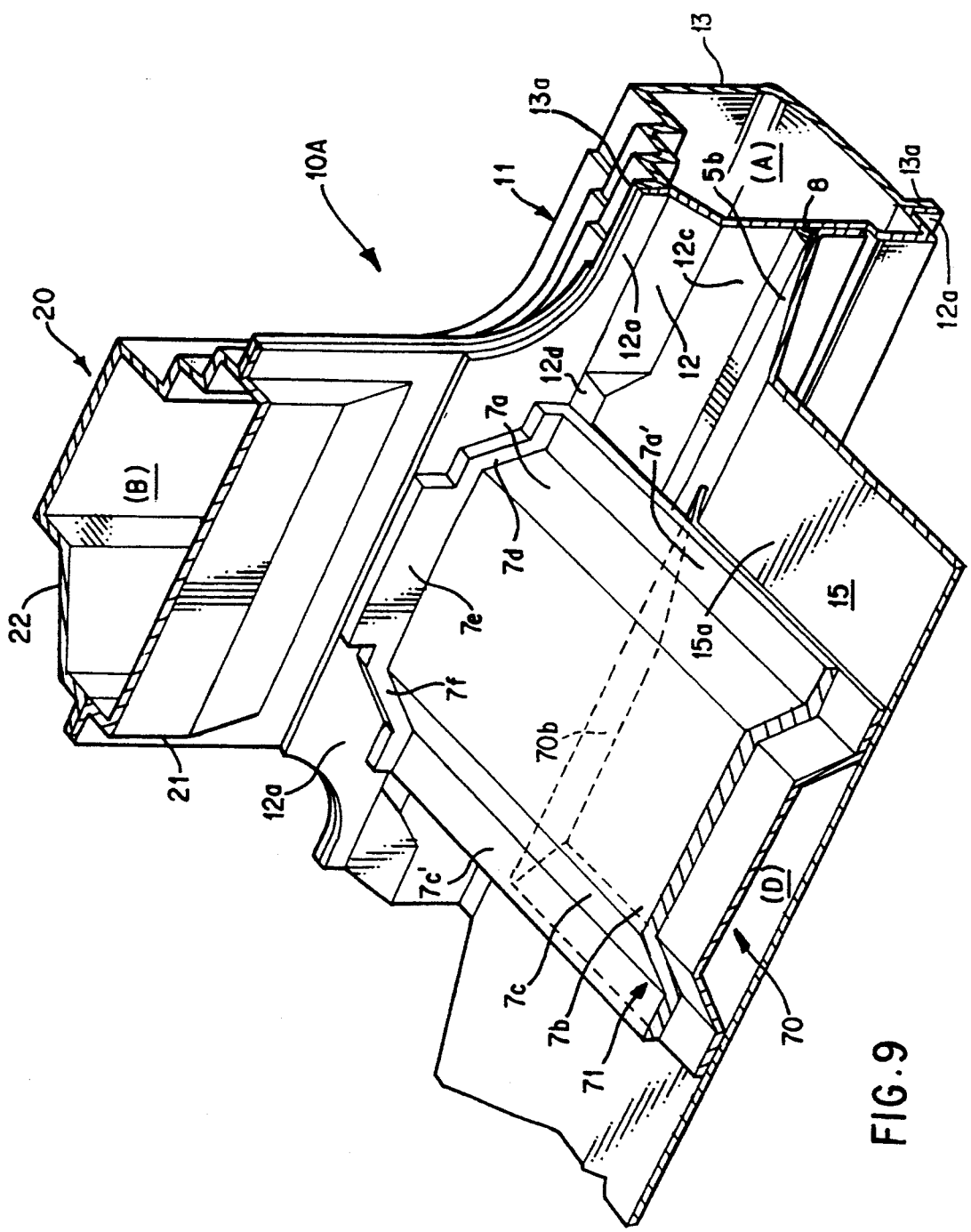
FIG. 9 is a detailed perspective view of a lower portion of a center pillar of a vehicle body in accordance with another preferred embodiment of the present invention.
Figure 10:
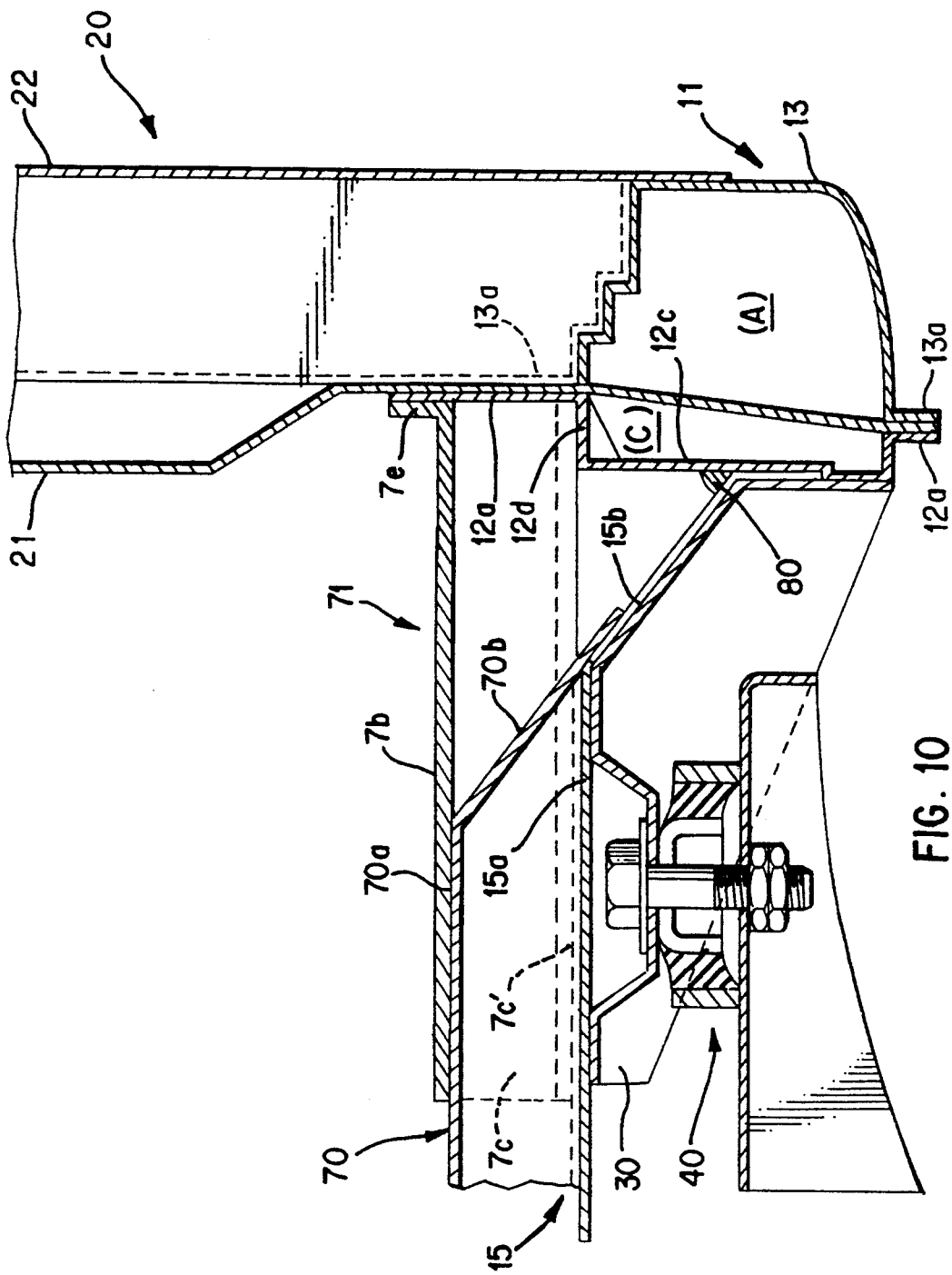
FIG. 10 is a cross-sectional view of FIG. 9.

Referring to FIGS. 9 and 10, a vehicle body in accordance with another preferred embodiment of the present invention is shown. The vehicle body 10A is provided with a side sill 11 extending in a lengthwise direction of the body from the front to the back. The side sill 11 comprises an inner side sill member 12 and an outer side sill member 13. The inner side sill member 12 is formed with upper and lower flanges 12a. The outer side sill member 13 is formed with upper and lower flanges 13a. The inner and outer side sill members 12 and 13 are secured to each other through the upper and lower flanges 12a and 13a so as to form a closed cross section (A). A center pillar 20 is provided so as to extend upward from the side sill 11. The center pillar 20 comprises an inner pillar member 21 and an outer pillar member 22 secured to each other so as to form a closed cross section (3). The outer pillar member 22 is connected at its lower end to the outer side sill member 13. The inner pillar member 21 has a lower end extending into the cross section (A) formed between the inner and outer side sill members 12 and 13 and secured between the flanges 12b and 13b of the the inner and outer side sill members 12 and 13. In such a way, a cross section (C) is formed by the lower end portion of the of the inner pillar member 21 and a vertical wall 12c of the inner side sill member 12 as shown in FIG. 10.

A floor panel 15 is formed with an extension 15b extending downward at an angle through which the floor panel 15 is welded, or otherwise secured, to the inner side sill member 12. A generally U-shaped cross beam 70 extends in a transverse direction of the vehicle body and is welded, or otherwise secured, to the floor panel 15 so as to form a cross section (D) therebetween. The cross beam 70 has an extension 70b extending downward at an angle which is welded, or otherwise secured, to the floor panel extension 15b. A connecting member 71 is disposed on an end portion of the cross beam 70 and extends between an end portion of the cross beam 70 and the flange 12a of the inner side sill member 12. The connecting member 71 has a generally U-shaped cross section formed by a front wall 7a, a top wall 7b and a rear wall 7c so as to meet the cross beam 70. The connecting member 71 is formed with end flanges 7d, 7e and 7f through which the connecting member is welded, or otherwise secured, to the flange 12a of the inner side sill member 12. The inner side sill member 12 is formed with a shoulder 12d to which flanges 7a' and 7c' integral with the front wall and rear walls 7a and 7c of the connecting member 71 are secured. At the connection between the floor panel extension 15b of the floor panel 15 and the vertical wall 12c of the inner side sill member 12, there is provided a sealing member 80.

A floor connecting bracket 30 is secured to the floor panel 15. A chassis connecting bracket 40 is secured to a chassis frame (not shown). The connecting brackets 30 and 40 are connected through an elastic mount member 45 so as to support the upper section of the vehicle body, including the floor panel 15 and the side sill 11, on the chassis frame.

Figure 11:
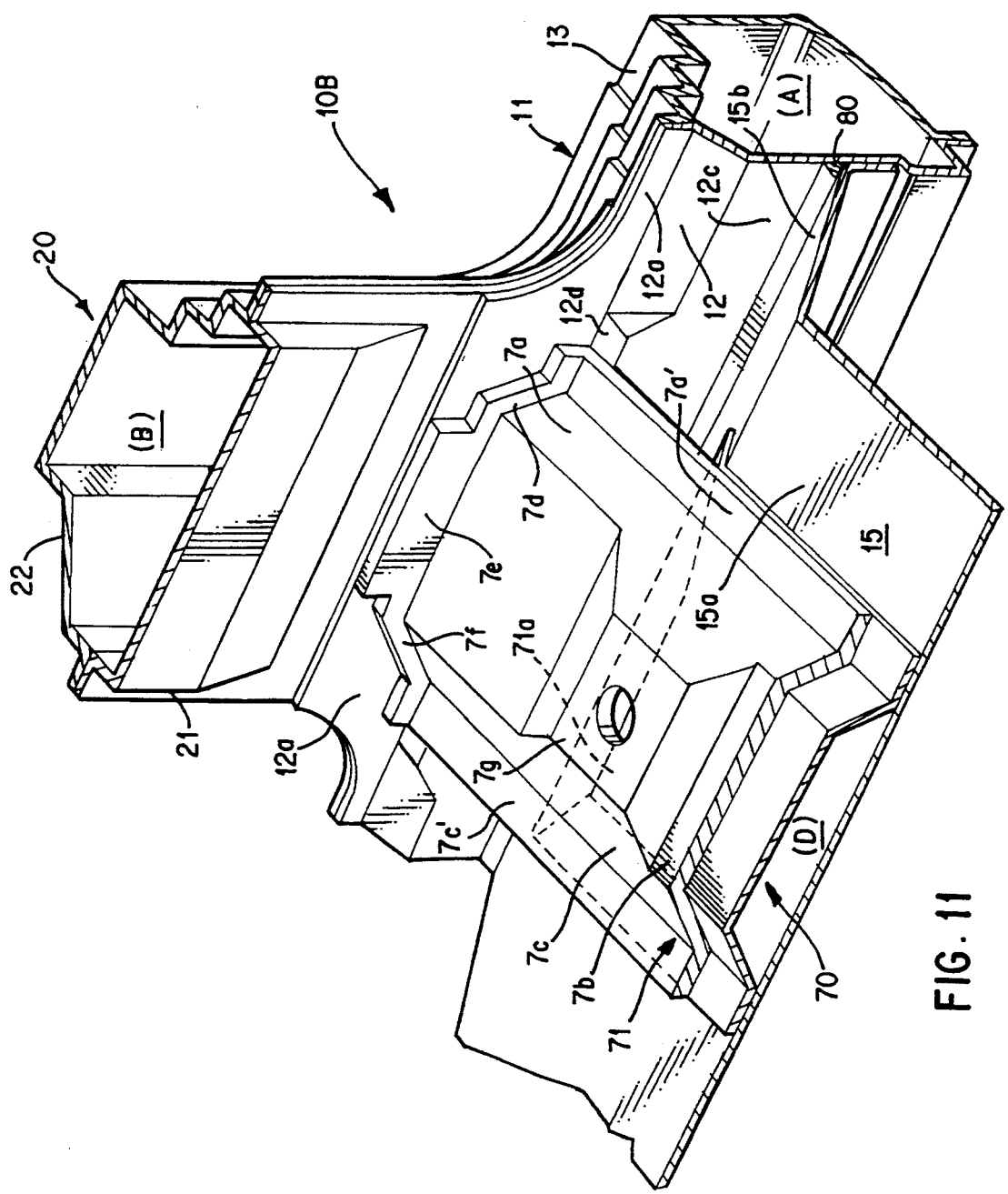
FIG. 11 is a detailed perspective view of a lower portion of a center pillar of the vehicle body in accordance with still another preferred embodiment of the present invention.
Figure 12:
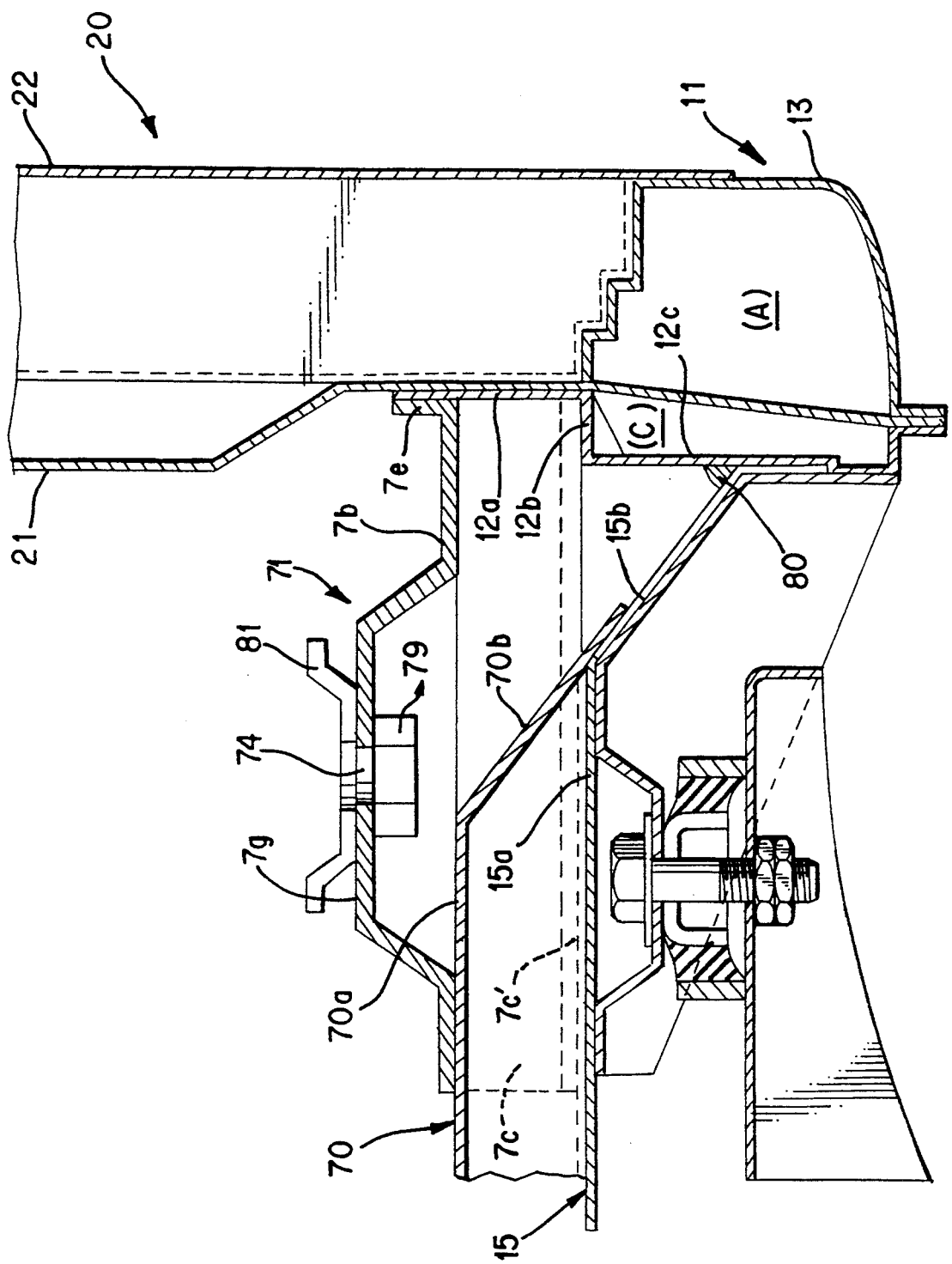
FIG. 12 is a cross-sectional view of FIG. 11.

Referring to FIGS. 11 and 12, a vehicle body in accordance with still another preferred embodiment of the present invention is shown. The vehicle body 10B is provided with a side sill 11 comprising an inner side sill member 12 and an outer side sill member 13. The inner and outer side sill members 12 and 13 are secured to each other through the upper and lower flanges 12a and 13a so as to form a closed cross section (A). A center pillar 20 is provided so as to extend upward from the side sill 11. The center pillar 20 comprises an inner pillar member 21 and an outer pillar member 22 secured to each other so as to form a closed cross section (B). The outer pillar member 22 is connected at its lower end to the outer side sill member 13. The inner pillar member 21 has a lower end extending into the cross section (A) formed between the inner and outer side sill members 12 and 13. In such a way, a cross section (C) is formed by the lower end portion of the of the inner pillar member 21 and a vertical wall 12c of the inner side sill member 12 as shown in FIG. 12.

A floor panel 15 is formed with an extension 15b extending downward at an angle through which the floor panel 15 is welded, or otherwise secured, to the inner side sill member 12. A cross beam 70 extends in a transverse direction of the vehicle body and is welded, or otherwise secured, to the floor panel 15 so as to form a cross section (D) therebetween. The cross beam 70 has an extension 70b extending downward at an angle which is welded, or otherwise secured, to the floor panel extension 15b. A connecting member 71 is disposed on an end portion of the cross beam 70 and extends between an end portion of the cross beam 70 and the flange 12a of the inner side sill member 12. The connecting member 71 is thicker than the cross beam 70 and has a cross section formed by a front wall 7a, a top wall 7b and a rear wall 7c so as to meet the cross beam 70. The connecting member 71 is formed with end flanges 7d, 7e and 7f through which the connecting member is welded, or otherwise secured, to the flange 12a of the inner side sill member 12. The inner side sill member 12 is formed with a shoulder 12d to which flanges 7a′ and 7c′ integral with the front wall and rear walls 7a and 7c of the connecting member 71 are secured. At the connection between the floor panel extension 15b of the floor panel 15 and the vertical wall 12c of the inner side sill member 12, there is provided a sealing member 80.

On the top wall 7b of the connecting member 71, there is secured a seat fitting mount 7g formed integrally with the top wall 7b. The seat fitting mount 7g is formed with a hole 74 and secured with a nut 79. As shown in FIG. 12, a slide rail 81 is bolted to the seat fitting mount 7g so as to allow a seat (not shown) to move in the lengthwise direction. Since the seat fitting mount 7g is integrally formed with the connecting member 71, the stiffness of fitting of the seat is increased.

According to the vehicle bodies 10A and 10B, because the connecting member 71 connects the cross beam 70, secured to the floor panel 15, and the inner side sill member 12, secured to the outer side sill member 13 of the side sill 11 having a cross section (A), a sufficient stiffness of connection is obtained between the floor panel 15 and the side sill 11. As a result, the cross beam 70 can be decreased in thickness so as to have proper weight. Because the center pillar 20 forming a door opening is connected directly to the inner side sill member 12 and to the cross beam 70 through the connecting member 71, a sufficient structural stiffness of the vehicle body around the pillar 20 is kept even when a thin cross beam 70 is used.

Because there is formed a space having a generally triangular cross section between the extension 15b of the floor panel 15 and the inner side sill member 12, harnesses and the like can be disposed in the space without interferring with body structure members. Because the extension 15b of the floor panel 15 and the inner side sill member 12 forms an acute angled bottom, it is easy to apply a sealing material layer to the bottom of the triangular space and the space is certainly sealed. In particular, since the connecting member 71 is connected to the shoulder 12d of the inner side sill member 12 through the flanges 7a′ and 7c′, the stiffness of connection between the connection member 71 and inner side sill panel 12 is greatly increased.

It is also to be understood that although the present invention has been described with respect to preferred embodiments thereof, various other embodiments and variants may occur to those skilled in the art. Such other embodiments and variants which fall within the scope and spirit of the invention and are intended to be covered by the following claims.

What is claimed:

1. A body structure of a vehicle body comprising:
   a chassis frame for forming a chassis of the vehicle body;
   a pair of side sills disposed on opposite sides of said chassis frame and extending in a lengthwise direction of the vehicle body, each of said side sills including an inner side sill member and an outer side sill member connected so as to form a closed cross section therebetween;
   a floor panel formed with an upper surface and a downwardly bent side extension of said upper surface and secured to each said inner side sill member;
   a cross beam extending in a transverse direction of the vehicle body and secured to said floor panel so as to form a closed cross section therebetween, said cross beam having an end; said ends of said cross beam being secured to one said side extension; and
   a connecting member disposed between an upper surface of said cross beam and said inner side sill member for rigidly connecting said cross beam and said inner side sill member.

2. A body structure as defined in claim 1, wherein said connecting member is thicker than said cross member.

3. A body structure as defined in claim 1, wherein said inner side sill member is provided with a shoulder, extending inward, against which said connecting member abuts.

4. A body structure as defined in claim 1, and further comprising a seat fitting mount formed integrally with said connecting member for fitting a seat to said floor panel.

5. A body structure as defined in claim 1, and further comprising connecting bracket means for resiliently connecting said floor panel to said chassis frame.

6. A body structure of a vehicle body comprising:
   a chassis frame for the vehicle body;
   a pair of side sills disposed on opposite sides of said chassis frame, each of said side sills extending in a lengthwise direction of the vehicle body;
   a floor panel formed with an upper surface and a downwardly bent side extension of said upper surface and placed on said chassis frame and connected to said side sills;
   a cross beam extending in a transverse direction of the vehicle body and secured to said floor panel so as to form a closed cross section therebetween, said cross beam having opposite ends;
   a pair of pillars, one of said pillars extending upward from each of said side sills;
   a plurality of connecting bracket means for connecting each of said side sills to said chassis frame, one of said connecting bracket means being transversely aligned with one of said pillars; and
   a connecting member disposed between said cross beam and one of said pillars for rigidly connecting one of said ends of said cross beam and said one of said pillars together.

7. A body structure as defined by claim 6, wherein said floor panel is formed with side extensions extending downward at an angle and secured to said side sills, and wherein said one end of said cross beam is secured to one of said side extensions.

8. A body structure as defined by claim 7, wherein said connecting member is disposed between said cross beam and one of said side sills for rigidly connecting said cross beam and said one of said side sills.

9. A body structure as defined in claim 6, and further comprising a seat fitting mount formed integrally with said connecting member for fitting a seat to said floor panel.

10. A body structure as defined in claim 6, and further comprising connecting bracket means for resiliently connecting said floor panel to said chassis frame.

* * * * *